United States Patent [19]

Alford et al.

[11] 4,126,604

[45] Nov. 21, 1978

[54] TREATMENT OF TALL OIL FATTY ACIDS

[75] Inventors: John A. Alford, Goose Creek; Michael W. Osborne, Charleston, both of S.C.

[73] Assignee: Westvaco Corporation, New York, N.Y.

[21] Appl. No.: 657,068

[22] Filed: Feb. 11, 1976

[51] Int. Cl.$^2$ .............................................. C09F 7/00
[52] U.S. Cl. ................................................. 260/97.5
[58] Field of Search ....................... 260/97.5, 98, 99.5

[56] References Cited

U.S. PATENT DOCUMENTS 3,786,037    1/1974    Krause et al. ....................... 260/97.5

Primary Examiner—Lewis T. Jacobs
Attorney, Agent, or Firm—Richard L. Schmalz; Ernest B. Lipscomb, III

[57] ABSTRACT

A process is disclosed for treating tall oil fatty acids with a zinc catalyst and an iodine catalyst to improve the color and color stability of distilled products. The zinc catalyst is employed in an amount of from 0.01% to about 2.0% by weight of fatty acid and the iodine in an amount from 50 to 500 parts per million of fatty acid. The tall oil fatty acids are treated with the iodine and zinc catalysts at a temperature between 150° C. to 275° C.

7 Claims, No Drawings

TREATMENT OF TALL OIL FATTY ACIDS

BACKGROUND OF THE INVENTION (1) Field of the Invention

This invention relates to a process for treating tall oil fatty acids. More particularly, this invention relates to a process for treating tall oil fatty acid with a zinc catalyst and an iodine catalyst to improve the color and color stability of the tall oil fatty acids.

Tall oil is a natural mixture of rosin acids and fatty acids, together with unsaponifiable materials, which is obtained by acidifying the black liquor skimmings of the sulfate process of wood pulp manufacture, using resinous woods such as pine. The composition of tall oil varies somewhat depending upon such factors as the species of the wood which was pulped. Crude tall oil acids generally contain from about 18% to 60% fatty acids, 28% to 66% rosin acids and 3% to 24% other constituents, notably unsaponifiable materials. Crude tall oil may be distilled and fractioned to separate the fatty acid and rosin acid fractions.

Tall oil fatty acids normally consist of a major portion of mono-unsaturated oleic acids and diunsaturated linoleic acids (in approximately equal proportions), small quantities of saturated acids and unsaponifiables. Also, since tall oil fatty acids are derived from tall oil, which contains substantial quantities of rosin acids, small quantities of the latter may also be present. The Bureau of the Census of the U.S. Department of Commerce has accepted the definition of "tall oil fatty acids" as that material produced from crude tall oil which contains 90% or more free fatty acids. Most commercially available tall oil fatty acids contain substantially more than 90% fatty acids and substantially less than 10% rosin acids.

(2) The Prior Art

The color of tall oil fatty acids has hindered the desirability of their use in many applications where color is important. To attest this fact, the prior art is replicate with methods for making tall oil fatty acids lighter in color without changing the character of the fatty acids. Although the attempts to upgrade tall oil fatty acids are numerous, the following is representative of the more pertinent prior art. U.S. Pat. No. 2,515,739 to Smerechniak et al. wherein tall oil fatty acids were treated with 0.1% to 2.5% zinc to improve color. And in U.S. Pat. No. 2,763,638 to Nevin wherein tall oil fatty acids were treated with 0.05% to 2.0% zinc to improve drying properties.

Iodine is a well known catalyst for treating tall oil fatty acid. Iodine in amounts from 0.01% to 3.0% by weight has been used to disproportionate or to isomerize tall oil fatty acids as taught in such disclosures as U.S. Pat. No. 2,311,386 to Hasselstrom, U.S. Pat. No. 3,157,629 to Patrick, and U.S. Pat. No. 3,923,768 to Powers et al. Also, in U.S. Pat. No. 3,251,869 to Putnam et al., unsaturated fatty acids are treated with an iodine catalyst followed by treatment with a clay catalyst.

In contrast with the teachings of the above-described prior art, the claimed process does not use iodine in sufficient quantity for disproportionation or isomerization. The invention surprisingly obtains lighter color and better color stability using a zinc catalyst and an iodine catalyst together than is available using either alone.

It is, therefore, the general object of this invention to provide a catalyst system for treating tall oil fatty acids to upgrade their color.

Another object of this invention is to provide a process for upgrading the color and maintaining the color stability of tall oil fatty acids without changing the physical character of the fatty acids.

It is a further object of this invention to provide a process which accomplishes the above objects using in combination a zinc catalyst and an iodine catalyst.

Other objects, features and advantages of this invention will be evident from the following detailed description.

SUMMARY OF THE INVENTION

It has been found that the treatment of tall oil fatty acids with small amounts of iodine and zinc leads to a significant improvement in the initial color and color stability of the distilled fatty acids. The zinc is used in an amount from about 0.01% to 2.0% by weight fatty acids and the iodine in an amount from about 50 to 500 parts per million of fatty acids. The tall oil fatty acids may be treated with both zinc and iodine catalysts at the same time or consecutively in either order. During catalyst treatment the fatty acids are at a temperature between 150° C. to 275° C. The thus treated tall oil fatty acids are almost identical in composition to tall oil fatty acids treated with zinc alone; but surprisingly when distilled, a distillate fraction having a Gardner color less than 1 may be obtained at the preferred conditions.

DETAILED DESCRIPTION OF THE INVENTION

In carrying out the process of this invention, the tall oil fatty acids are treated with both zinc catalyst and iodine catalyst at the same time or consecutively in either order. The catalysts are added to the tall oil fatty acids and heated to the desired temperature or added while the fatty acids are hot.

The amount of iodine catalyst added is from about 50 to 500 parts per million of fatty acids, preferably from about 100 to 200 parts per million. The amount of iodine must not exceed the upper limit or disproportionation and isomerization of the fatty acids will take place. The source of iodine catalyst may be as free iodine or such iodine sources as amine hydroiodides, for example, ammonium iodide. Other iodine compounds which break down to iodine during treatment include aliphatic organic iodides, for example, propyl iodide and inorganic iodides, for example, aluminum iodide. As stated, the source of the iodine catalyst is not really a concern as long as it forms iodine during the treatment.

While as little zinc as 0.01% by weight of the tall oil fatty acids show some improvement in the properties, it is preferable to use from about 0.05% to about 0.5% by weight of the zinc. In general, however, amounts ranging up to about 1% to 2% may be used effectively, with larger amounts up to 5%, for example, presenting no material advantage. The zinc is preferably added in a finely divided form such as zinc dust or zinc powder. However, zinc in any other desirable form may also be used as, for example, mossy zinc, zinc turnings or granular zinc.

The temperature used for treatment of the tall oil fatty acid mixture is preferably from about 175° C. to about 235° C., but temperatures ranging from 150° C.–275° C. are effective within the broader aspects of the present inventive concept. The pressure maintained during the treatment of the tall oil fatty acid mixture is preferably normal atmospheric pressure, but it is to be appreciated that sub-atmospheric or super-atmospheric pressures may be used with corresponding changes in temperatures.

The time required for catalyst treatment will depend to a large extent upon the final color desired. For example, significant color improvement is as soon as the zinc catalyst makes contact with the tall oil fatty acids. Other factors affecting the treatment time include temperature, amount of color bodies in the starting fatty acids and the degree of agitation. Generally, 5 minutes to 10 minutes are needed to obtain a commercially desirable color improvement.

It is not necessary that the process be carried out in the presence of an inert atmosphere although it is desirable since contact with air tends to cause darkening of the tall oil. It is desirable to conduct the treatment in an inert atmosphere to avoid this darkening effect, and also as an aid for the removal of volatile impurities. Suitable inert gases which may be used include nitrogen, hydrogen, dry steam, carbon dioxide and the like.

If desired, solvents may be used to reduce the viscosity of the tall oil, especially at lower temperatures, and to maintain a temperature fixed by the boiling point of the mixture. This is advantageous in some cases since improved and more intimate contact of the fatty acid/solvent mixture with the zinc metal particles can thus be attained where lower temperatures may be preferred. Suitable solvents include non-aqueous solvents such as mono-cyclic aromatic hydrocarbons, i.e., benzene, toluene, xylene, etc., petroleum hydrocarbons, terpenes, and the like.

Distillation of the tall oil fatty acids treated according to the process of the present invention is the simple distillations normally carried out in the industry. Temperatures and pressures are, of course, interdependent and vary within wide related ranges. In the present case, however, it has been found that temperatures of from about 200° C. to about 240° C. and pressures of from about 3 to about 15 mm. are preferred, although lower and higher values are effective, provided the conditions are such that the tall oil fatty acids are distillable away from the undesirable natural antioxidants and interfering anti-drying bodies. The distillations may also be carried out in the presence of steam or an inert gas such as carbon dioxide, nitrogen, etc., at relatively higher pressures of from about 30 to about 70 mm. Hg. or more.

With regard to the color-forming materials which are present in the tall oil fatty acids and which are removed by the process of the present invention, it is presumably believed that they comprise phenolic bodies and other antioxidants and that they are normally present in amounts of from about 0.01% to about 1.0% by weight. Their exact chemical structure and nature, however, have not been established; but it has been determined that, once they are removed by the process herein described the thus treated tall oil fatty acid mixture acquires excellent color and is almost identical in composition to tall oil fatty acids treated only with zinc.

The practice of this invention may clearly be seen from the following examples in which the proportions are by weight unless otherwise indicated.

EXAMPLE 1

The tall oil fatty acid feed used in this example to illustrate the practice of this invention refers to a singularly distilled tall oil fatty acid comprising, approximately 92.4% fatty acids, 4.6% rosin acids and 3.0% unsaponifiables and other materials. Typically, the Acid Number was 193, the Saponification Number 195 and the initial Gardner Color 7½.

This example illustrates the effects on fatty acid color using the process of this invention. Portions of the tall oil fatty acid feed were treated with 75–125 parts per million iodine and zinc at 0.025 to 0.1% and heating at various temperatures from 175° C. to 225° C. The thus treated fatty acids were distilled at 205° C.–215° C., and 10 mm. Hg. pressure. A 95% distillate fraction was obtained. After measuring initial color, the distillate portions were placed in a forced-air oven at 105° C. and the color stability measured after 2 hours. The results using the various parameters are shown in the table below:

| Iodine (ppm.) | Zinc (Wt. %) | Temp. (° C.) | Time (Min.) | Before Treatment Color (Gardner) | Distilled Product Color (Gardner) | Product Color Stability 2 hr. at 105° C. (Gardner) |
|---|---|---|---|---|---|---|
| No Catalyst | | 200 | 15 | 7-½ | 6+ | 6+ |
| 75 | 0 | 200 | 15 | 7-½ | 6− | 6+ |
| 0 | 0.025 | 200 | 15 | 7-½ | 6− | 6− |
| 75 | 0.025 | 200 | 15 | 7-½ | 5 | 6− |
| 125 | 0 | 200 | 15 | 7-½ | 5 | 6− |
| 0 | 0.100 | 200 | 15 | 7-½ | 4− | 4 |
| 125 | 0.100 | 200 | 15 | 7-½ | 3+ | 4− |
| 100 | 0 | 225 | 15 | 7-½ | 5− | 5+ |
| 0 | 0.050 | 225 | 15 | 7-½ | 4 | 5− |
| 100 | 0.050 | 225 | 15 | 7-½ | 4− | 4+ |
| No Catalyst | | 175 | 15 | 7-½ | 6+ | 6-½ |
| 100 | 0 | 175 | 15 | 7-½ | 5-½ | 6 |
| 0 | 0.050 | 175 | 15 | 7-½ | 5+ | 6− |
| 100 | 0.050 | 175 | 15 | 7-½ | 5− | 6− |

The data clearly show the synergism present when treating tall oil fatty acids with zinc and iodine. The results show both better initial color and color stability.

EXAMPLE 2

A sample of the tall oil fatty acid feed was heated under an atmosphere of nitrogen to 235° C. To the hot acid was added 0.05% of zinc dust and the mixture stirred for 30 minutes while maintaining the temperature at 235° C. The zinc treated fatty acids were distilled at 220° C.–235° C. and 10 mm. Hg. pressure. The distillate fraction was then treated with 150 ppm. iodine at 235° C. for 30 minutes. The zinc and iodine treated fatty acids were again distilled in a like manner as before. The initial Gardner color of the distillate was 1−. The color after 2 hours remained 1+.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for upgrading the color and maintaining the color stability of tall oil fatty acids without changing the physical character of the fatty acids, which comprises;

(a) treating said fatty acids with from 50 to 200 parts per million iodine and elemental zinc metal in an amount from 0.01% to about 2.0% by weight of said fatty acids at a temperature from about 150° C. to 275° C.; and (b) distilling the thus treated fatty acids and obtaining tall oil fatty acids having improved color and color stability.

2. The process according to claim 1 wherein said iodine is present in an amount from 100 to 200 parts per million and said zinc is present in an amount from 0.05% to 0.5%.

3. The process according to claim 1 wherein the time for treating with iodine and zinc together is at least 5 minutes.

4. The process according to claim 1 wherein the iodine treatment precedes the zinc treatment.

5. The process according to claim 1 wherein the iodine treatment and zinc treatment are carried out co-currently.

6. The process according to claim 1 wherein the zinc treatment precedes the iodine treatment.

7. The process according to claim 1 wherein both the iodine and zinc treatments are at a temperature of from about 175° C. to 235° C.

* * * * *